United States Patent
Urabe

[11] Patent Number: 5,170,754
[45] Date of Patent: Dec. 15, 1992

[54] INTAKE SYSTEM FOR V-TYPE INTERNAL COMBUSTION ENGINE

[76] Inventor: Suehiro Urabe, Kanagawa, Japan

[21] Appl. No.: 848,151

[22] Filed: Mar. 9, 1992

[30] Foreign Application Priority Data

Mar. 11, 1991 [JP] Japan .................. 3-44907

[51] Int. Cl.5 .......................................... F02M 35/10
[52] U.S. Cl. .................................................. 123/52 MV
[58] Field of Search ......... 123/52 M, 52 MB, 52 MV, 123/52 MC

[56] References Cited

U.S. PATENT DOCUMENTS

| | | | |
|---|---|---|---|
| 4,809,647 | 3/1989 | Masumoto et al. | 123/52 MB |
| 4,878,460 | 11/1989 | Uchida et al. | 123/52 MV |
| 4,981,115 | 1/1991 | Okasako et al. | 123/52 MV |
| 4,989,553 | 2/1991 | Ueda et al. | 123/52 MV |
| 5,010,854 | 4/1991 | Suehiro et al. | 123/52 MV |

FOREIGN PATENT DOCUMENTS

| | | | |
|---|---|---|---|
| 0421116 | 4/1991 | European Pat. Off. | 123/52 MB |
| 60-69255 | 4/1985 | Japan . | |
| 0201017 | 8/1990 | Japan | 123/52 MB |

Primary Examiner—David A. Okonsky
Attorney, Agent, or Firm—Foley & Lardner

[57] ABSTRACT

An intake system for a V-type internal combustion engine has two banks. To keep the same charging efficiency between right and left banks of the engine, the divided portions of the air duct are formed to be the same in passage length by bending one of the divided portions of the air duct in a U-shape. Furthermore, the U-shaped part is disposed above a cooling fan to reduce the ventilation resistance of the U-shaped part by cooling the intake air passing through the U-shaped part.

6 Claims, 2 Drawing Sheets

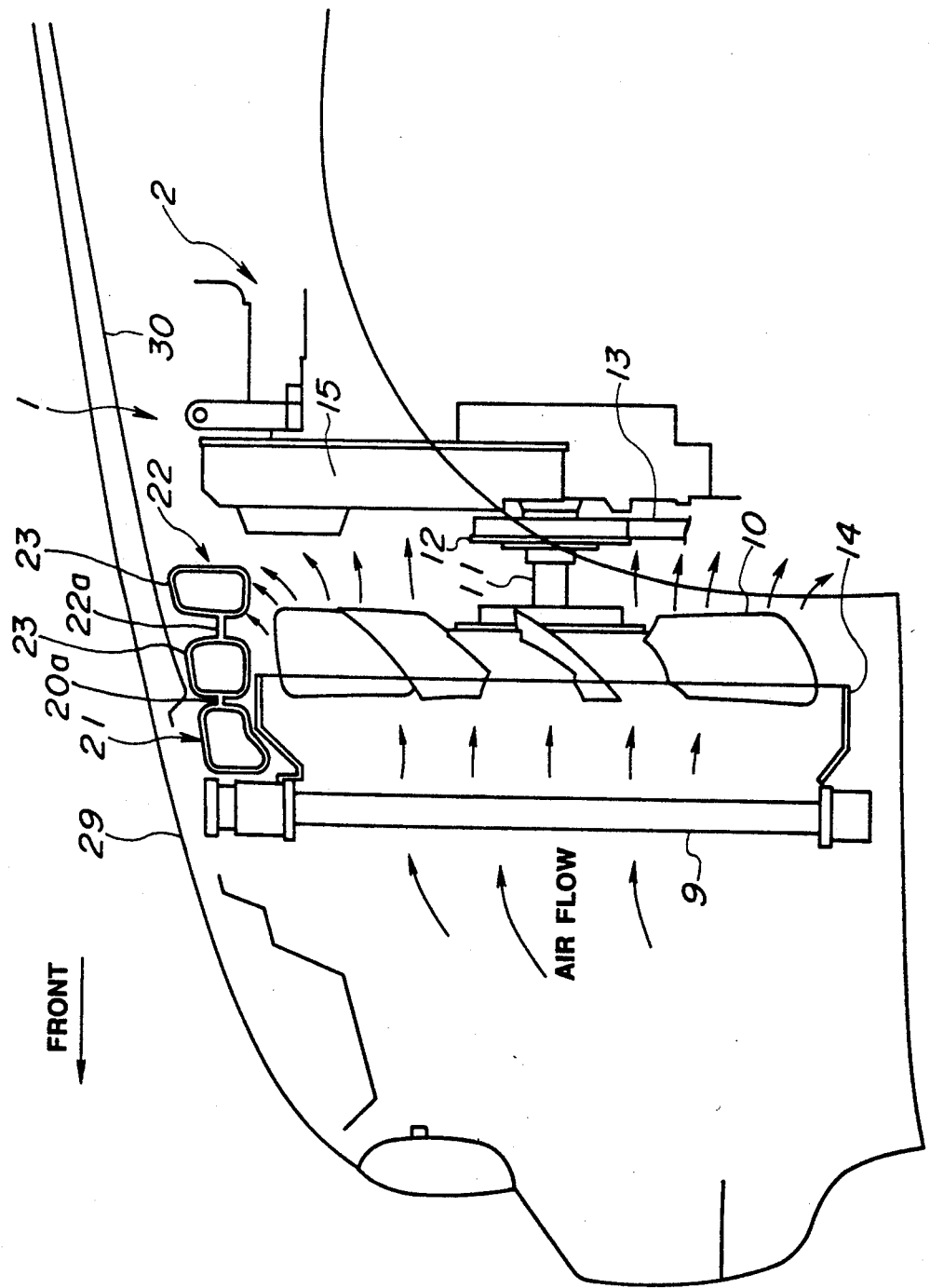

ies in an improvements in an intake system for a V-type internal combustion engine

INTAKE SYSTEM FOR V-TYPE INTERNAL COMBUSTION ENGINE

BACKGROUND OF THE INVENTION

1. Field of the Invention

The present invention relates to improvements in an intake system for a V-type internal combustion engine, and more particularly to an installation structure of an air duct for guiding air from an air cleaner to each collector of each bank for a V-type internal combustion engine.

2. Description of the Prior Art

Japanese Patent Provisional Publication 60-69255 discloses a V-type internal combustion engine which is provided with a pair of banks including a plurality of cylinders, respectively and a pair of collectors disposed above the banks, respectively for application to a car which does not have a sufficient space to arrange an air cleaner at a center portion in the engine compartment. Such a V-type internal combustion engine is provided with an air cleaner which is disposed at one lateral side portion in an engine compartment. An air duct for feeding outside air to the collectors is divided into two branches and connected to the collectors, respectively.

However, such a conventional intake system causes problems in that the engine is degraded in power output characteristics and generates unexpected vibrations as a result of the length of the air ducts for both collectors differing from each other.

SUMMARY OF THE INVENTION

It is an object of the present invention to provide an improved intake system by which a V-type engine having two banks is operated so that the respective power outputs of the banks are properly balanced in every engine speed.

An intake system according to the present invention is for a V-type internal combustion engine which has first and second banks. The intake system comprises an air cleaner which is disposed to the side of the first bank. A first collector is located above the first bank. A second collector is located above the second bank. An air duct is connected at its one end to the air cleaner and divided into front and rear branches. The front branch extends laterally and is connected to the second collector. The rear branch extends along the front branch and is bent in a U-shape above a cooling fan connected to the engine so as to return to the side of the first bank. The rear branch is connected to said first collector.

With this arrangement, the air duct is formed so that the length of the air duct for the first collector is the same as that for the second collector. Accordingly, the balance between the respective power outputs of the banks is adjusted, and therefore the output characteristics of the engine are improved while the factor of engine vibration is eliminated.

BRIEF DESCRIPTION OF THE DRAWINGS

FIG. 2 is a side cross-sectional view of the intake system, taken in the direction of the arrows substantially along the line II—II of FIG. 1.

DETAILED DESCRIPTION OF THE INVENTION

Figure 1:
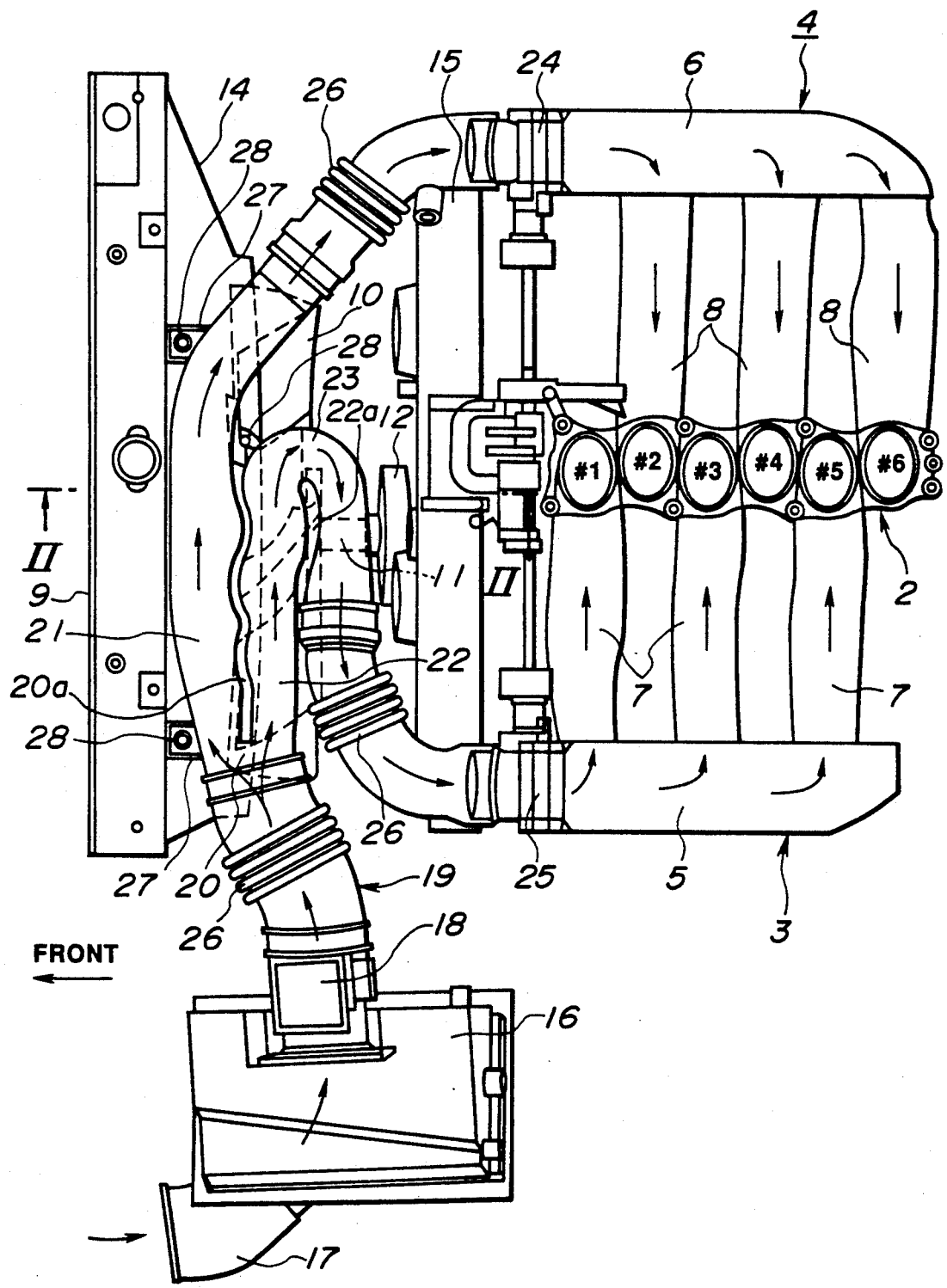
FIG. 1 is a top view of an embodiment of an intake system for a V-type internal combustion engine according to the present invention.

Referring now to FIGS. 1 and 2, there is shown a preferred embodiment of an intake system S for a V-type internal combustion engine 2 in accordance with the present invention.

The engine 2 of this embodiment is of the six-cylinder type and used for an automotive vehicle. The engine 2 includes an engine block (no numeral) in which first (left) and second (right) banks 3, 4 are disposed respectively to the left and the right hand sides in an engine compartment 1 of the automotive vehicle. The banks 3 and 4 are arranged V-shaped to have a predetermined angle around a crankshaft of the engine 2. First and second collectors 5 and 6 are disposed above the first and second banks 3 and 4, respectively. The six cylinders #1, #2, #3, #4, #5 and #6 of the engine 2 are arranged such that the cylinders #1, #3 and #5 are formed in the first bank 3 and fluidly communicated with the first collector 5 through air pipes 7, and the cylinders #2, #4 and #6 are formed in the second bank 4 and fluidly communicated with the second collector 6 through air pipes 8.

A radiator 9 for cooling the coolant of the engine 2 is disposed at a front and center portion in the engine compartment 1. The engine 2 is disposed rearward of the radiator 9 and provided with a cooling fan 10 at its front. The cooling fan 10 is rotated by a driving force of the engine 2 through a drive shaft 11. A fan pulley 12 is communicated with the crank pulley (not shown) of the crankshaft through a fan belt 13. A part of the cooling fan 10 is disposed in a fan shroud 14 attached to the rear side of the radiator 9. The front portion of the engine 2 is covered with a belt cover 15 while being fixedly connected with the belt cover 15.

An air cleaner 16 is disposed at a front and lateral side portion in the engine compartment 1, and more exactly, at a portion located to a left hand side in the engine compartment 1 and between the radiator 9 and the engine 2, as shown in FIG. 1. The air cleaner 16 has an intake air inlet 17 connected to an air conducting duct (not shown) through which outside air is conducted. An outlet of the air cleaner 16 is connected through an air flow meter 18 to an air duct 19 through which intake air is fed to the first and second collectors 5 and 6. The air duct 19 is divided at a branch point 20 into front and rear duct portions 21 and 22. The divided duct portions 21 and 22 are connected to each other through a first reinforcing rib 20a. The air duct 19 is fixedly secured to the fan shroud 14 through a bracket 27 with bolt 28. The front duct portion 21 is arranged to extend generally straight to the second collector 6 which is located above the second bank 4. The rear duct portion 22 is arranged to return to the first collector 5 of the first bank 3 at the half way point to the right hand side in the engine compartment. The rear duct portion 22 of a U-shape is disposed above the cooling fan 10. That is, the front duct portion 21 extends to the right hand side of the automotive vehicle from the branch point 20 and along the upper surface of the fan shroud 14. The front duct portion 21 further extends to the right hand side of the automotive vehicle and is connected to the front end portion of the second collector 6 through the throttle chamber 24.

The rear duct portion 22 extends to the fan shroud 14 and is bent in a U-shape above a generally center portion of the cooling fan 10. The bent duct part 23 of the rear duct portion 22 extends to the left hand side of the automotive vehicle and is connected to the front end portion of the first collector 5 through a throttle chamber 25. Accordingly, the front and rear duct portions 21 and 22 are formed to have the same length. Furthermore, the front and rear duct portions 21 and 22 are formed at the portions near the throttle chambers 24 and 25 with bellows portions 26 for absorbing some vibrations. The two generally straight parts of the U-shaped rear duct portion 22 are connected to each other through a second reinforcing duct 22a.

The manner of operation of the thus arranged intake system will be discussed hereinafter.

Fresh air passing through the air cleaner 16 is fed to the front and rear duct portions 21 and 22 after being branched at the branch point 20. The air passing through the rear duct portion 22 flows into the first collector 5 through the throttle chamber 25 and flows into the cylinders #1, #3 and #5 through the air pipes 7. The air passing through the front duct portion 21 flows into the second collector 6 through the throttle chamber 24 and flows into the cylinders #2, #4 and #6 through the air pipes 8.

On the other hand, outside air led into the engine compartment 1 passes through the radiator 9 and reaches the fan shroud 14. The air flowing into the fan shroud 14 is blown to the engine 2 and a peripheral portion of the cooling fan 10 such as the second duct portion 22.

With the thus arranged intake system S, the lengths of the duct portions 21 and 22 are set to be the same with each other. Although the U-shaped part of the rear duct portion 22 generates a predetermined ventilation resistance and degrades the charging efficiency of intake air, this problem is solved by cooling the rear duct portion 22 such that the outside air blown by the cooling fan 10 cools the intake air passing through the rear duct portion 22. Accordingly, the respective power outputs of the first and second banks 3 and 4 are properly balanced. This improves the output characteristics of the engine and eliminate some factors that cause engine vibration.

While the present invention has been described in its preferred embodiment, it will be understood by those skilled in the art that the foregoing and other changes in form and details can be made therein without departing from the spirit and scope of the invention.

What is claimed is:

1. An intake system for a V-type internal combustion engine having first and second banks, said intake system comprising:
   an air cleaner disposed to the side of the first bank;
   a first collector located above the first bank;
   a second collector located above the second bank; and
   an air duct connected at its one end to said air cleaner and divided into front and rear branches, the front branch extending laterally and being connected to the second collector, the rear branch extending along the front branch and being bent in a U-shape above a cooling fan connected to the engine so as to return to the side of the first bank, the rear branch being connected to said first collector.

2. An intake system as claimed in claim 1, wherein the U-shaped portion of the rear branch receives blown air generated by the cooling fan disposed between a radiator and the engine.

3. An intake system as claimed in claim 1, wherein the air duct front and rear branches are connected to each other through a first rib.

4. An intake system as claimed in claim 1, wherein the U-shaped portion of the rear branch includes a pair of generally straight parts which are connected through a second rib.

5. An intake system as claimed in claim 1, wherein a passage length of said air duct from the air cleaner to the first collector is the same as a passage length of the air duct from the air cleaner to the second collector.

6. An air duct for a V-type internal combustion engine used for an automotive vehicle, the engine having first and second collectors which are disposed respectively above first and second banks of the engine, said air duct comprising:
   an inlet portion having first and second ends and extending laterally relative to the engine, the first end of said inlet portion being connected to an air cleaner disposed near the first bank;
   a first branch portion connected at its one end to the second end of said inlet portion and extending laterally to be generally straight with said inlet portion, the other end of said first branch portion being connected to the second collector; and
   a second branch portion connected at its one end to the second end of said inlet portion and extending along said first branch portion and being bent in a U-shape, the other end of said second branch being connected to the first collector.

* * * * *